United States Patent [19]

Allais

[11] Patent Number: 4,480,599
[45] Date of Patent: Nov. 6, 1984

[54] FREE-PISTON ENGINE WITH OPERATIVELY INDEPENDENT CAM

[76] Inventor: Egidio Allais, Corso Italia 15, Saluzzo, Italy

[21] Appl. No.: 416,959

[22] Filed: Sep. 9, 1982

[51] Int. Cl.$^3$ ............... F02B 71/00; H02K 57/00
[52] U.S. Cl. ................. 123/46 R; 123/46 E; 123/51 R; 123/56 C; 123/23; 123/668
[58] Field of Search .......... 123/46 R, 46 E, 51 R, 123/51 A, 51 B, 51 AC, 51 BC, 56 C, 23, 24, 668, 669

[56] References Cited

U.S. PATENT DOCUMENTS

| | | | |
|---|---|---|---|
| 1,785,643 | 12/1930 | Noack et al. | 123/46 E |
| 1,844,478 | 2/1932 | Omo | 123/51 A |
| 3,675,031 | 7/1972 | Lavigne | 123/46 E |
| 4,240,379 | 12/1980 | Armbruster | 123/23 |
| 4,419,971 | 12/1983 | Nakamura et al. | 123/193 C |

FOREIGN PATENT DOCUMENTS

| | | |
|---|---|---|
| 1384701 | 11/1964 | France . |
| 1433426 | 2/1966 | France . |
| 0068221 | 8/1979 | Italy . |

Primary Examiner—Craig R. Feinberg
Assistant Examiner—David A. Okonsky
Attorney, Agent, or Firm—Young & Thompson

[57] ABSTRACT

A free-piston engine formed by one or more units, each comprising a pair of opposed pistons connected to a common piston rod and movable within two opposed cylinders, with a load, such as the inductor of a linear alternator, connected to an intermediate point of the piston rod, and in which there is provided at least a cam controlled by an operatively independent motor and engaging at least a tappet connected to the piston rod of a unit of pistons. This cam is profiled and controlled in such a way as to substantially follow the movement of the tappets which is produced by the free-piston engine during normal operation, but to limit the travel of the piston units and provide the energy for the compression stroke, in case of anomalous operation. The cam serves also to start the engine, as well as to mutually synchronize the various units of pairs of pistons in engines having a plurality of units. The engine may also be in the form of an adiabatic engine fed by coal dust or other solid fuel.

9 Claims, 9 Drawing Figures

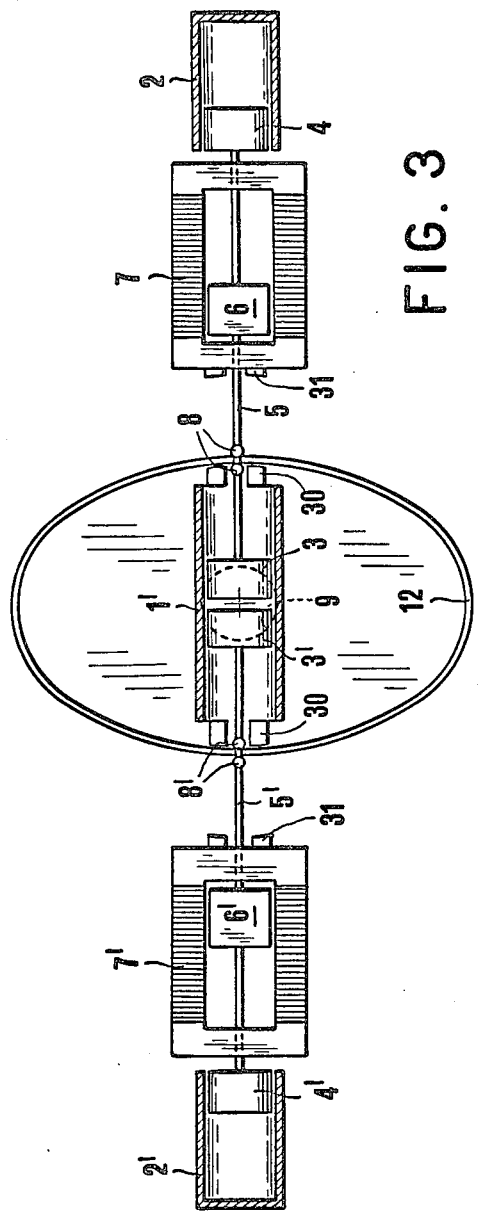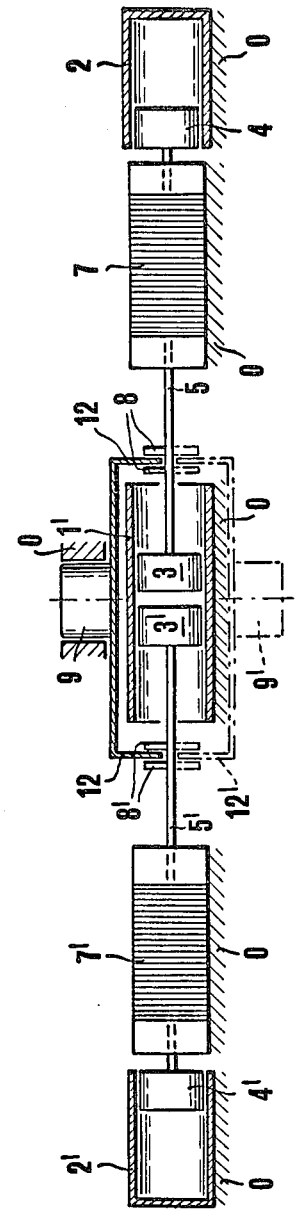

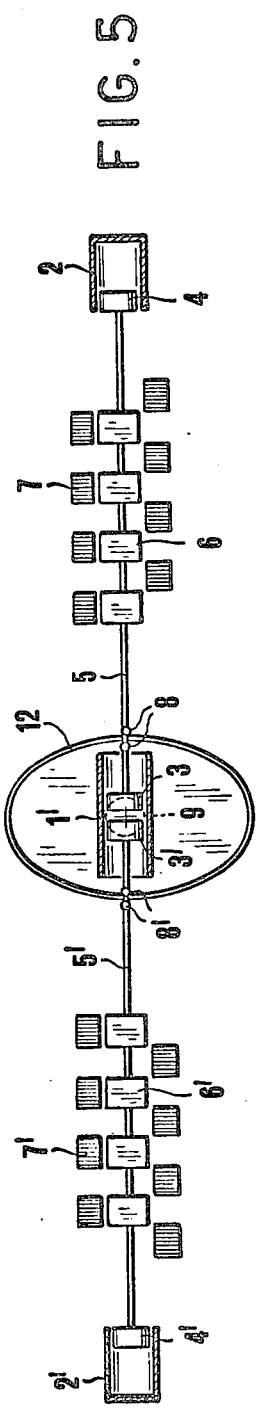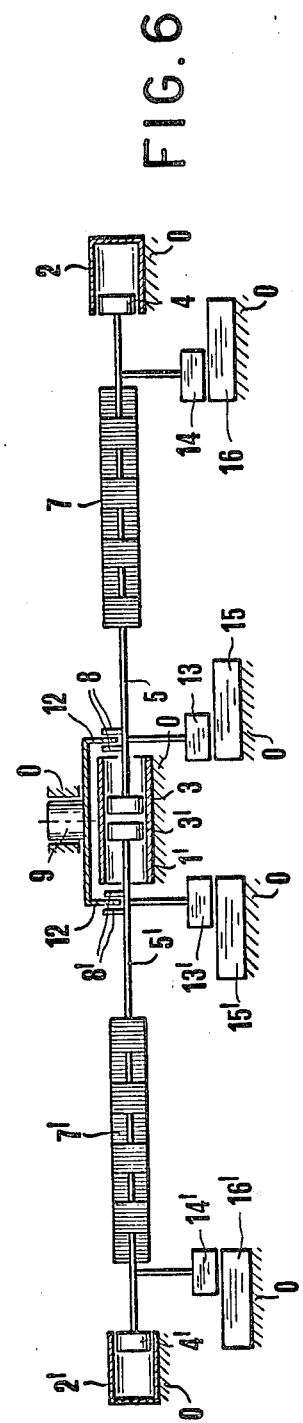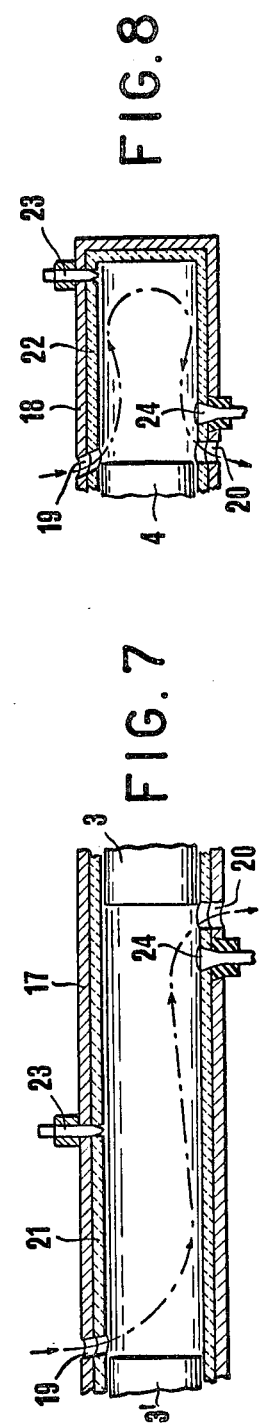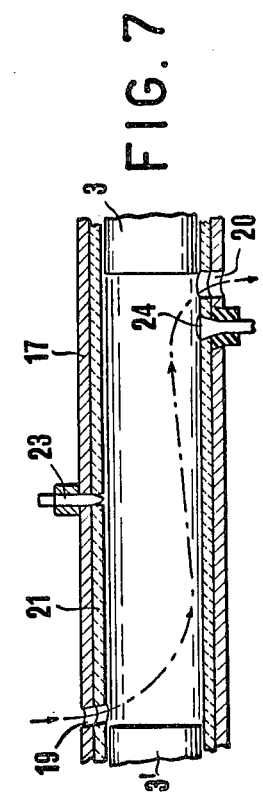

FREE-PISTON ENGINE WITH OPERATIVELY INDEPENDENT CAM

BACKGROUND OF THE INVENTION

This invention relates to improvements to free-piston internal combustion engines, especially those which are intended to be used for the operation of electric generators with linear alternators.

It is known that the internal combustion engines with connecting rod and crank, especially when used for the operation of electric generators. are unsatisfactory as regards both their low efficiency and the production of harmful gases to which they give rise. Their substitution by gas turbines is only possible in case of very high powers, on account of the high costs of such turbines and the technological problems these turbines cause. For middle power applications the so-called free-piston engines have been proposed. In these engines, owing to the absence of linkage, it is essentially the inertia of the movable parts which delays the displacement of the piston immediately after the beginning of the combustion, thereby ensuring the availability of a sufficient time for the vaporization, mixing and combustion in the chamber the cylinder, whilst the thrust corresponding to the high pressures which are generated during this stroke, instead of being hindered by linkage, is accumulated in the movable parts in the form of kinetic energy and is utilized in the continuation of the cycle. Therefore, in these engines, in addition to the constructional simplifications and the reduction of the mechanical losses, directly inherent to the elimination of linkage, conditions are created which are more favourable for the conversion of the energy, with consequent increase of the efficiency and reduction of the thermal losses, the temperature of the exhaust gas and the content, in these latter, of pollutant substances, especially nitric oxide.

However, the free-piston engines in their turn cause serious problems which have not yet been completely solved; among these problems, the most serious regard the supply of energy for carrying out the compression stroke, the synchronization of the movement of the various pistons and the limitation of the travel of these latter, which problems, in the conventional engines, are solved by the presence of linkage connected to a driving shaft provided with a flywheel, whilst no corresponding parts are provided in the free-piston engines.

For the execution of the compression stroke it has been proposed (Jarret) to provide hydraulic springs counteracting the pistons, which springs however involve constructional difficulties and efficiency losses and give rise to losses of liquid; the particular problem is solved, during normal operation (Allais), by an arrangement of opposed cylinders, but in the case of lack of combustion this solution becomes ineffective if it is not integrated by other means, which hitherto were formed by gearing or linkage which it would be preferable to avoid. No effective solution which does not involve the use of linkage or gearing has been provided so far to ensure the limitation of the travel of the pistons to a predetermined value, or to ensure the synchronism in the movement of the pistons in an engine comprising a plurality of units.

BRIEF SUMMARY OF THE INVENTION

The object of this invention is to provide a free-piston engine connectable to a generator with linear alternator, which will be completely free from linkage and gearing intended to transmit the mechanical energy produced, and in which however there will be ensured the performance of the compression stroke even in case of lack of combustion, the performance, by the pistons, of a travel extending between accurately predetermined limits, and the possibility of obtaining an easy syncronization in case of engines having a plurality of units.

The concept of the invention consists in the use of at least a cam, actuated by an operatively independent motor, engaged by a tappet rigidly connected to the piston rod of at least a unit including, at its own ends, a pair of pistons acting within two opposite cylinders, and in an intermediate location the movable element of a linear alternator or other load.

Thanks to this arrangement, the piston rod of the unit, and consequently the relevant pistons, are caused to move within the limits and with the law of the movement which are predetermined by the cam actuated by its own operatively independent motor. By a suitable design of the profile of the cam and by suitably adjusting its speed of acutation it is possible to obtain that during the normal operation the law of the movement imposed by the cam coincides with the spontaneous motion of the free-piston unit, so that no transfer of energy between the cam (and, consequently, the operatively independent motor) and the tappet (and, consequently, the free-piston engine) will take place. However, the presence of the cam, in case of any anomaly of operation prevents the free pistons from exceeding the predetermined limits of travel, and in case of accidental lack of one or more combustions the cam drags through the tappet the piston rod of the unit and thereby allows the performance of the compression stroke which otherwise could not take place. In addition, in case of engines composed of a plurality of units, to obtain the complete synchronization of the various units it is sufficient to provide a synchronization between the relevant cams.

Thanks to the creation of the favourable law of the movement of the pistons and to the elimination of any linkage and power gearing, as well as other members sucn as the hydraulic springs, a free-piston engine according to the present invention provides an overall efficiency which is much higher than that of the conventional reciprocating engines and also somewhat higher than that of turbines of equal power; in addition, a great saving is obtained in the consumption of lubricating oil, whilst the low pollution characteristics of the free-piston engines may be taken advantage of in the most favourable manner. Finally, the cam with an operatively independent motor may be used to start the engine, if it is deemed to be suitable, as an alternative to the compressed air systems or to the temporary utilization, as motor, of the linear alternator, which systems are known at present for the free-piston engines.

The invention also relates to particular arrangements for an engine of the specified type, and particularly to a magnetic support for eliminating the load acting on the walls of the cylinders, in the large engines, due to the weight of the movable parts; and to arrangements for a correct operation in engines fed with coal dust or other solid fuels.

BRIEF DESCRIPTION OF THE DRAWINGS

These and other characteristics and advantages of the subject of the present invention will be more clearly apparent from the following description of some embodiments given by way of non-limiting examples and diagrammatically shown in the annexed drawings, in which:

FIGS. 3 and 4 show, similarly to FIGS. 1 and 2, an engine comprising two opposite units with a single operatively independent cam;

FIGS. 5 and 6 show, similarly to FIGS. 3 and 4, an engine with magnetic support of the piston rods of the units;

FIGS. 7 and 8 are sectional views showing details of the cylinders of an engine according to FIGS. 3 and 4, or 5 and 6, intended to operate with coal dust or other solid fuel;

DETAILED DESCRIPTION OF PREFERRED EMBODIMENTS

For the sake of simplicity and clarity of representation, in all the Figures there are omitted the auxiliary service parts, such as ports, valves, injectors; washing, cooling and lubrication means etc., which parts pertain to the known art and do not require any modification for being used in the present invention. The supporting structure for all fixed parts is generally shown diagrammatically by 0.

Figure 1:
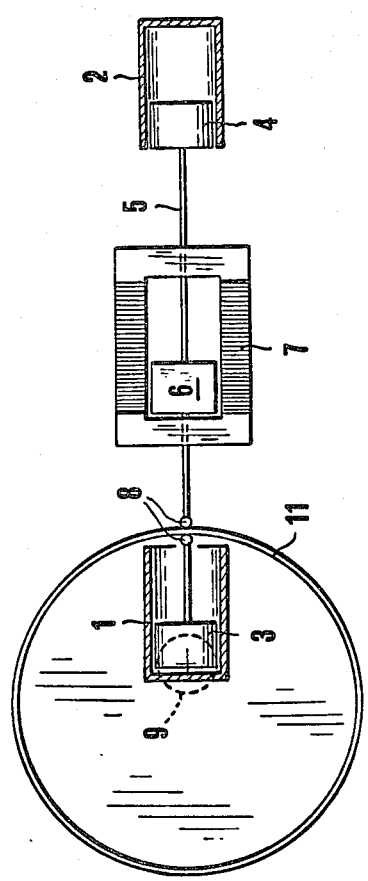
FIG. 1 shows, as seen from below, the schema of a single unit of a free-piston engine with operatively independent cam, according to the present invention.

The unit shown in FIG. 1 comprises two opposite cylinders 1 and 2, having mounted therein the pistons 3 and 4, respectively, rigidly connected to one another by a piston rod 5 which in an intermediate location supports the load, in the present case the inductor 6, for example a permanent magnet, of a linear alternator 7. These parts form a free-piston engine with electric generator, of a type which per se has already been proposed by the Applicant himself, in which the compression stroke of each cylinder is activated by the expansion within the opposed cylinder, so that during normal operation no auxiliary means are required for activating the compression stroke, while the limits of travel are determined (however not in a rigid manner) by the resistance to compression of the mixture intended to produce the subsequent combustion. However, both effects are missing in some cases of irregularities of operations, and in order to obviate such disadvantage, according to the present invention there is provided a cam 11, supported and actuated by an operatively independent eccentric motor 9, and engaging with a tappet rigidly connected to the piston rod 5 of the unit. Said tappet may be formed by a pair of sturdy pins 8, eventually with rollers, or by a groove of the piston rod 5 or other equivalent means; the cam is shown as having a circular profile, but it is intended tat its profile may be suitably predetermined for the best operation of the free-piston engine. The independent motor 9 is controlled in such a manner that the rotation of the cam 11 will be substantially synchronous with the operation of the free-piston engine, so that during normal operation the engagement between the cam 11 and the tappet 8 is only virtual and does not involve resistances of transmission of energy. However, should the piston rod 5 tend not to stop at the predetermined limit of travel, the contact between the tappet and the cam becomes active and the travel of the rod 5 with the pistons 3 and 4 is positively limited. Similarly, if one of the cylinders fails carrying out a combustion, and consequently is not able to perform the compression in the opposed cylinder, tappet 8 begins to actively cooperate with the cam 11, and the operatively independent motor 9 of this latter supplies the energy required for carrying out the compression, avoiding the stopping of the free-piston engine. Similarly, the start of the free-piston engine may be carried out by the operatively independent motor 9 when it is desired not to use compressed air systems or the linear alternator as a starting motor, as is usual for the free-piston engines.

Preferably, the control of the operatively independent motor 9 is carried out in such a way that the cam 11 will tend to a slight advance relative to the movement of the tappet 8, so as to avoid, during normal conditions, any hindrance to the displacement of the piston rod 5 and, thus, to the operation of the free-piston engine. Suitable means, not shown, prevent the rod 5 from rotating about itself in order to maintain the tappet 9 in the correct position of cooperation with the cam 11.

Cam 11 is provided with a balancing mass 10. This mass may be modified relative to what is necessary for the balancing of the cam itself, in order to provide a partial balancing of the unit of the free-piston engine, which unit per se is not balanced.

The operatively independent motor 9 must be of a type capable of supplying a higher couple in case of necessity, without appreciably modifying its own speed. Thus, it may be a shunt-excited motor, a motor metadyne or an electric motor provided with a suitable electronic control device. Suitable means may be provided for disconnecting the linear alternator during the periods which the operatively independent motor 9 is required to make up for functional deficiencies of the free-piston engine, so as to limit the load acting on the operatively independent motor.

Figure 2:
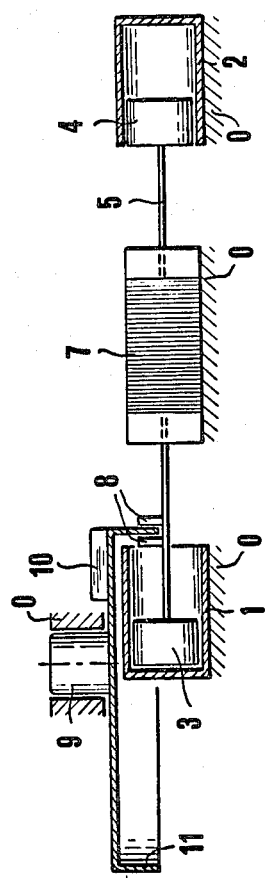
FIG. 2 is a side view of the single unit of the engine, shown in FIG. 1.

FIGS. 3 and 4 show an arrangement of two units similar to that shown in FIGS. 1 and 2, which arrangement is per se balanced and requires a single cam for both units, also creating between them a rigid synchronism. The two units, of which the right-hand one is indicated by the same reference numerals as the unit described hereinabove, and the left-hand one is indicated by corresponding primed reference numerals, are disposed symmetrically, with the pistons 3 and 3' opposed in a single central cylinder 1'; the cam 12 (which in the present case cannot be circular, but has to be substantially elliptical or oval) has at least an axis of symmetry and cooperates with both tappets 8 and 8' of the piston rods 5 and 5'. In the present case, both the free-piston engine and the cam are per se balanced both statically and dynamically and do not require any balancing mass. For the sake of symmetry of construction and actuation, a second cam 12', having its own operatively independent motor 9' or kinematically connected to the first cam 12, may be arranged as shown in FIG. 4.

It is clear that by suitably selecting the profile of the cam 11 or 12 it is possible to predetermine for the pistons the most appropriate travel in respect of the functional effects, and if desirable, it is also possible to moderately affect the law of the movement of the pistons in order to adjust some strokes, especially the combustion stroke and the expansion stroke. To the same purpose, instead of or in addition to the appropriate selection of the profile of the cam, provision may be made for the cam to be actuated at variable speed by the operatively independent motor 9, subjected to an adequate electronic control and/or to periodical discontinuities of the power feed. With the use of integrated circuits it also appears possible to carry out a control which may vary depending on the conditions of operation, for example depending on the load imposed on the linear alternators.

As it can be understood from the foregoing, the load applied by the tappets to the cam, in case of serious troubles, can become very high, namely at the locations of maximum and minimum distance of the cam from its center. In order to avoid a massive and heavy construction of the cam in view of meeting requirements which only seldom can arise, it is possible to install, as shown in FIG. 3, support means 30 inside the cam and 31 outside this latter, arranged in such a way as to be skimmed by the cam during its normal rotation; in case of a heavy overload, the cam is subjected to an elastic deformation and rests against said means 30 and 31, discharging the excess of stress received. The support means 30 and 31 may be rollers, or they may also be stationary, accepting in this case the braking effect which they exert on the cam when this latter comes into contact with them, which does not appear to be a serious trouble on account of the very low frequency of such event.

Alternatively, it could be possible to arrange travel limitation counterstops acting on the tappets 8, 8' of the rods 5 and 5'.

Thanks to these provisions the cams may be designed for their normal moderate load and not for the maximum load which can be expected in exceptional cases such as the breaking of the piston rings or the like. Thus, the cams may be of a relatively lightweight construction, for example of ribbed plate.

Since the engine according to the present invention has already per se high efficiency and specific power, it is possible to provide according to the present invention engines having reduced overall weights and dimensions relative to normal engines of equal power, and this, as is known, has a particular importance for industry.

Since a free-piston engine generally requires being installed with its cylinders at least approximately horizontal, the weight of the pistons, the piston rod and the inductor of the linear alternator is applied to one side of the wall of the cylinders, which could cause disadvantages especially in case of large engines. To avoid this disadvantage, according to the present invention provision is made for a magnetic support of the movable parts, as shown in FIG. 6. The rods 5 and 5', in this case, are provided with slides 13, 14, 13', 14' slidable above supports 15, 16, 15', 16'; both the slides and the supports are permanently magnetized so that the respective like poles will face and repel each other. By suitably designing said parts it is possible to compensate, with precision or at least approximately, the weight of the movable parts and to support them without introducing any friction. The arrangement results in being particularly advantageous in case of using linear alternators having a plurality of inductors and armatures, as shown in FIGS. 5 and 6, in order to obtain from the alternators a current having a behaviour more similar to the sinusoidal behaviour.

The invention may be applied to free-piston engines both of the carburation type of the liquid or gaseous fuel injection type, and with spark or compression ignition. However, the invention may be used advantageously also for providing adiabatic engines fed with coal dust or other solid fuel. In this case, particular arrangements have to to be provided both for obtaining the adiabaticity of the engine and to enhance the elimination of the combustion ash. FIGS. 7 and 8 show such arrangements for the cylinder 17 having opposed pistons (which corresponds to the cylinder 1' of the preceding Figures) and for an end cylinder 18, respectively. Reference numeral 19 indicates the air inlet openings and reference numeral 20 indicates the discharge openings, which traverse the walls of the cylinders 17 and 18 and the respective inner coatings 21 and 22 of ceramic material; reference numeral 23 indicates the coal dust injector, and the chain lines indicate the trajectory of the flow of air from the inlet opening 19 to the discharge opening 20. Disposed near this latter is an electrode 24 which, as soon as the combustion has taken place, is fed with a high electric voltage, so as to exert a high electrostatic attraction on the combustion ash, which ash is attracted towards the discharge opening in order to be then ejected by the washing air flow. Preferably, the electrode 24 is then earthed to avoid electrostatic attraction phenomena on the injected fuel dust, which phenomena could jeopardize the uniform distribution of said dust for the combustion within the cylinder.

Figure 9:
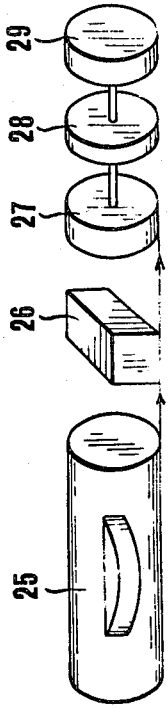
FIG. 9 shows the composition of an assembly for the production of electric energy, utilizing the engine according to the present invention.

In the cases in which the current produced by the linear alternators, which usually does not have a satisfactory sinusoidal behaviour, cannot be used as it is, as shown in FIG. 9, it may be supplied by the generator 25 actuated by the engine according to the present invention, to a rectifier unit 26 and then to a direct current motor 27 coupled to a flywheel 28, downstream of which the produced energy may be utilized in any direct or indirect way, for example driving an alternator 29 to supply sinusoidal current, or a generator metadyne to feed traction motor metadynes, and so on. Flywheel 28 maintains the torque also in case of failure of some combustion in the cylinders. Moreover, the flywheel 28 may be provided with suitable fans for cooling the linear alternator or other parts.

Although having taken into consideration the typical case in which the free-piston engine drags a linear alternator to generate electric energy, it is clear that the engine of the invention may also be utilized for generating mechanical energy directly, especially when this energy is intended to be used in reciprocating form, as for compressors, pumps and the like.

I claim:

1. A free-piston internal combustion engine for actuation of an energy utilizer means having a reciprocable member, comprising: a supporting structure; at least one engine unit having two cylinders mounted on said structure opposite to one another, a piston mounted for reciprocation in each of said cylinders, and a piston rod connected to each said piston, an intermediate portion of said piston rod being connected to the reciprocable member of the utilizer means, and said piston rod having tappet means; at least one cam rotatably mounted on said structure and engaging said tappet means of the piston rod; and motor means in addition to said cylinders, said motor means operatively connected to said cam to rotate said cam independently of said cylinders and suitable for being controlled in substantial synchronism with the displacements of said piston rod; whereby during normal operation of the engine no subtantial transmission of energy takes place between the piston rod and the cam, whilst in case of anomalous operation of the free-piston engine the cam limits the stroke of the pistons and supplies to them from said motor means the energy required for the compression stroke.

2. A free piston engine as set forth in claim 1, comprising two said engine units, said cam engaging said tappet means of the piston rods of both engine units, whereby said cam serves both engine units and ensures their synchronization.

3. A free-piston engine as set forth in claim 2, wherein said two engine units are aligned and said cam is substantially elliptical in shape, whereby the whole engine is self-balanced both statically and dynamically.

4. A free-piston engine as set forth in claim 1, comprising two coaxial cams mounted on opposite sides of said piston rod.

5. A free-piston engine as set forth in claim 1, further comprising fixed supports mounted on said structure inside said cam so as to be skimmed during normal operation by portions of the cam having minimal distance from its center, said fixed supports being contacted by the cam in case of elastic deformation thereof due to excessive stress.

6. A free-piston eninge as set forth in claim 1, further comprising fixed supports mounted on said structure outside said cam so as to be skimmed during normal operation by portions of the cam having maximal distance from its center, said fixed supports being contacted by the cam in case of elastic deformation thereof due to excessive stress.

7. A free-piston engine as set forth in claim 1, further comprising magnetized supports fixed on said structure beneath said piston rods and in parallel relationship therewith, and magnetized slides connected to said piston rods and located above said magnetized supports, the homonymous magnetic poles of said magnetized supports and slides facing each other, whereby at least a part of the weight of the piston rods, pistons and reciprocable member of the energy utilizer means is supported by magnetic repulsion.

8. A free-piston engine as set forth in claim 1, wherein said energy utilizer means is at least one linear alternator, and its reciprocable member is an inductor.

9. A free-piston engine as set forth in claim 1, having the character of an adiabatic engine to be fed by solid fuel dust, wherein each cylinder comprises a lining of ceramic material and has a discharge opening, and an electrode is disposed adjacent said discharge opening and is intended for being connected to a high electric voltage source in order to attract towards the discharge opening the ashes resulting from the combustion of solid fuel, said electrode being grounded during feeding of the solid fuel dust.

* * * * *